(12) United States Patent
Lee et al.

(10) Patent No.: US 12,269,754 B2
(45) Date of Patent: Apr. 8, 2025

(54) DESALINATION DEVICE USING SOLVENT EXTRACTION METHOD, AND DESALINATION METHOD USING SAME

(71) Applicant: KOREA UNIVERSITY RESEARCH AND BUSINESS FOUNDATION, Seoul (KR)

(72) Inventors: Jae Woo Lee, Seoul (KR); Ou Kyung Choi, Yongin-si (KR); Jun Ho Seo, Gyeongsan-si (KR); Gyeong Su Kim, Anseong-si (KR); Dan Dan Dong, Sejong-si (KR); Xin Zhao, Seongnam-si (KR)

(73) Assignee: Korea University Research and Business Foundation, Seoul (KR)

( * ) Notice: Subject to any disclaimer, the term of this patent is extended or adjusted under 35 U.S.C. 154(b) by 95 days.

(21) Appl. No.: 17/727,227

(22) Filed: Apr. 22, 2022

(65) Prior Publication Data

US 2022/0250941 A1 Aug. 11, 2022

Related U.S. Application Data

(63) Continuation of application No. PCT/KR2020/014565, filed on Oct. 23, 2020.

(30) Foreign Application Priority Data

Oct. 23, 2019 (KR) .......... 10-2019-0132456
Oct. 21, 2020 (KR) .......... 10-2020-0136615

(51) Int. Cl.
*C02F 1/26* (2023.01)
*C02F 103/08* (2006.01)

(52) U.S. Cl.
CPC .......... *C02F 1/265* (2013.01); *C02F 2103/08* (2013.01); *C02F 2301/046* (2013.01); *C02F 2301/08* (2013.01)

(58) Field of Classification Search
CPC .......... C02F 1/265; C02F 2103/08; C02F 2301/046; C02F 2301/08
See application file for complete search history.

(56) References Cited

U.S. PATENT DOCUMENTS

| 5,145,569 A | 9/1992 | Schneider et al. |
| 5,458,751 A | 10/1995 | Gongora et al. |

(Continued)

FOREIGN PATENT DOCUMENTS

| JP | 2013-512092 A | 4/2013 |
| JP | 2014-161826 A | 9/2014 |

(Continued)

OTHER PUBLICATIONS

International Search Report for PCT/KR2020/014565 dated Jul. 15, 2021.
Written Opinion for PCT/KR2020/014565 dated Jul. 15, 2021.

*Primary Examiner* — Pranav N Patel
(74) *Attorney, Agent, or Firm* — Sughrue Mion, PLLC

(57) ABSTRACT

Provided is a desalination device using a solvent extraction method, comprising: a first mixing tank composed of a feed water inlet into which feed water comprising salt ions and water molecules flows, a first solvent inlet into which a first solvent selectively reacting more with the water molecules than with the salt ions flows, a first mixing tank body in which the feed water and the first solvent are mixed so as to form a mixed water, and a mixed water outlet through which the mixed water is discharged; a first separation tank composed of a mixed water inlet which communicates with the mixed water outlet so that the mixed water flows therein, a first separation tank body in which brine containing salt ions of the feed water and first treatment water formed from mixing the water molecules of the feed water and the first solvent of the mixed water are separated by layer, and a first (Continued)

treatment water outlet through which the first treatment water is discharged; a second mixing tank composed of a first treatment water inlet which communicates with the first treatment water outlet so that the first treatment water flows therein, a second solvent inlet into which a second solvent selectively reacting more with the first solvent than with the water molecules of the treatment water flows, a second mixing tank body in which the first treatment water and the second solvent are mixed so as to form second treatment water, and a second treatment water outlet through which the second treatment water is discharged; and a second separation tank composed of a second treatment water inlet which communicates with the second treatment water outlet so that the second treatment water flows therein, a second separation tank body in which the water molecules of the first treatment water and a composite solvent formed from mixing the first solvent of the first treatment water and the second solvent of the second treatment water are separated by layer, and a fresh water outlet through which fresh water composed of the water molecules is discharged.

13 Claims, 10 Drawing Sheets

(56) References Cited

U.S. PATENT DOCUMENTS

| | | | |
|---|---|---|---|
| 2012/0138532 A1* | 6/2012 | Bajpayee | C02F 1/265 |
| | | | 210/642 |
| 2022/0017385 A1* | 1/2022 | Yip | C02F 1/042 |

FOREIGN PATENT DOCUMENTS

| | | |
|---|---|---|
| JP | 2016-087494 A | 5/2016 |
| KR | 10-1574327 B1 | 12/2015 |
| KR | 10-2064089 B1 | 1/2020 |

* cited by examiner

[Fig. 1]
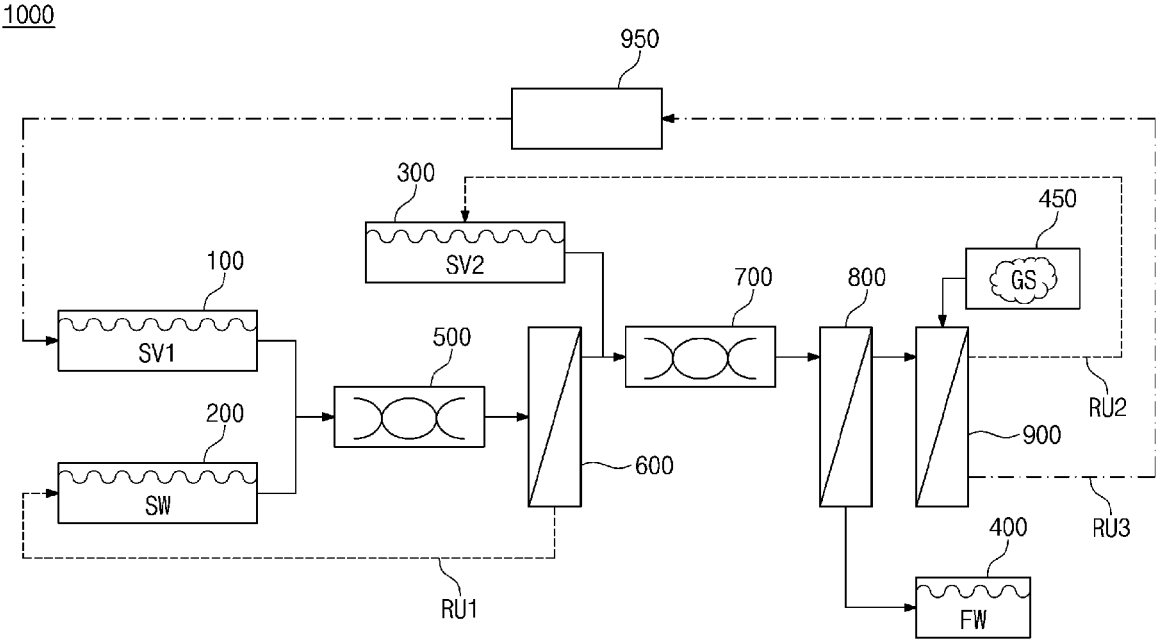

[Fig. 2]
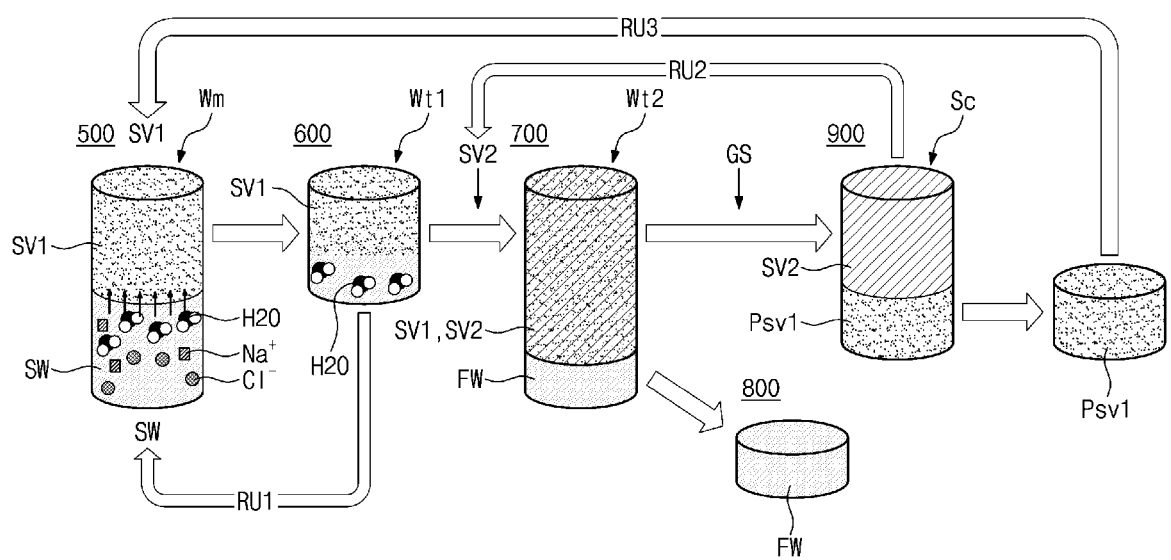

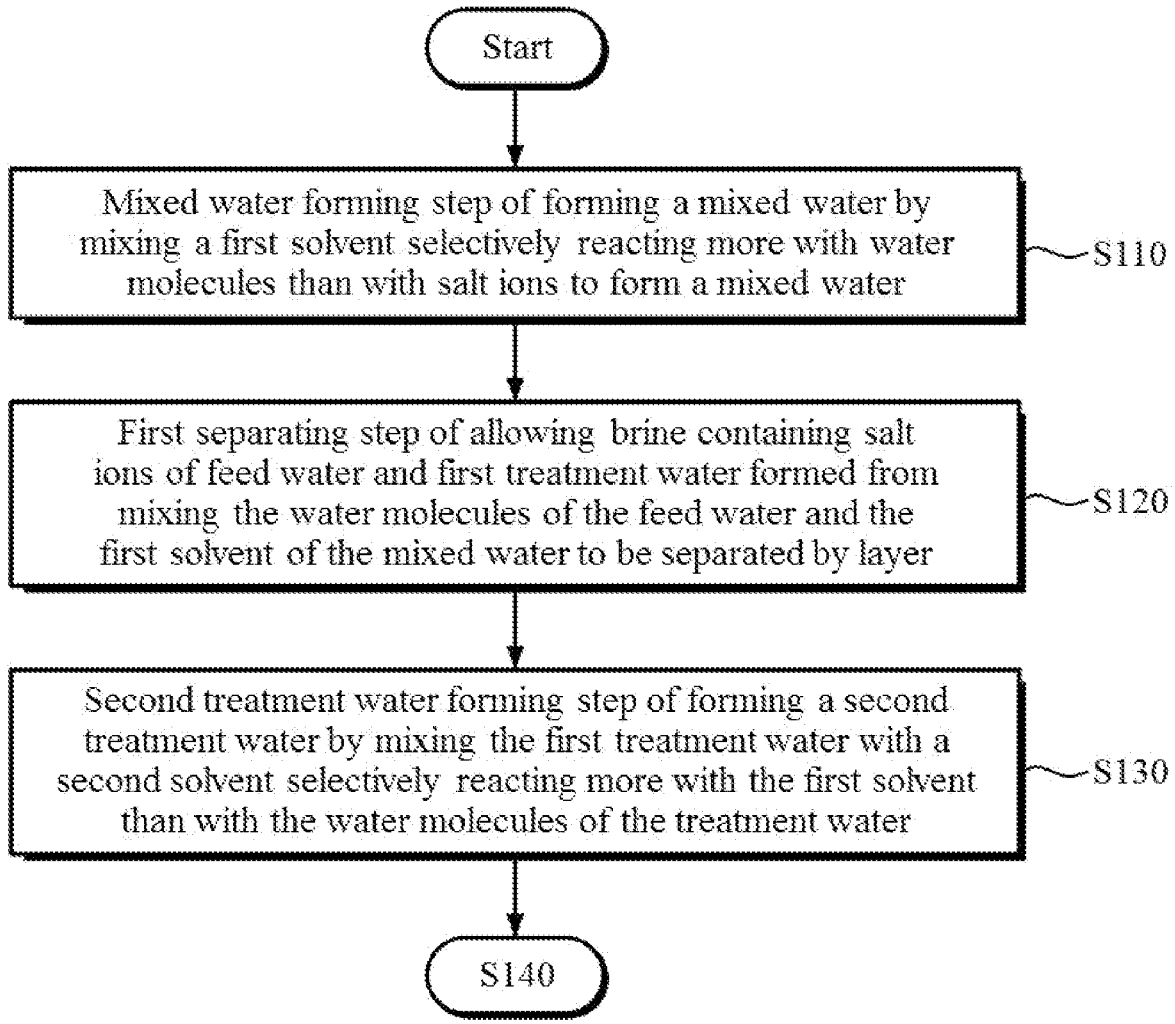
[Fig. 3]

[Fig. 4]
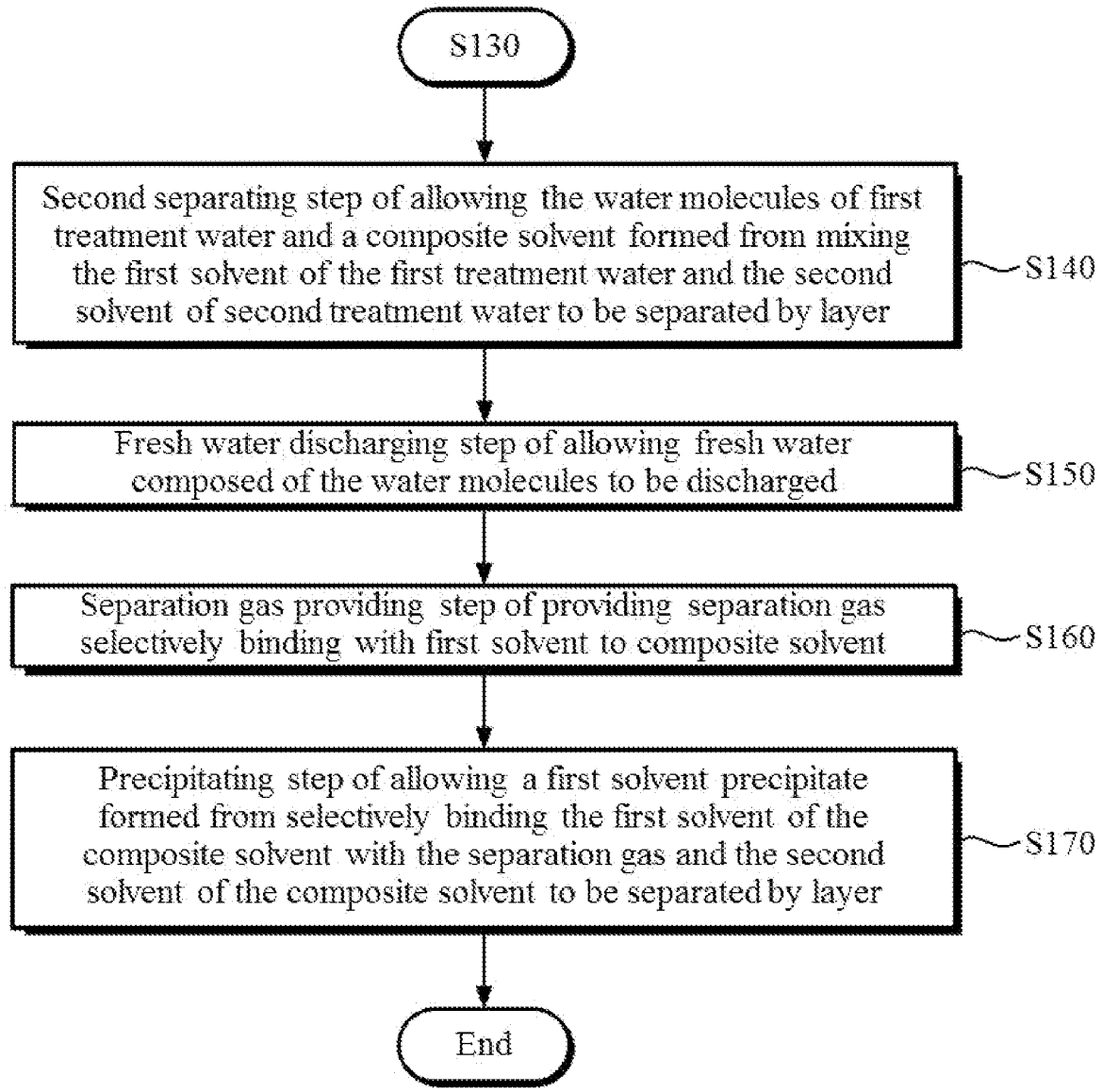

[Fig. 5]
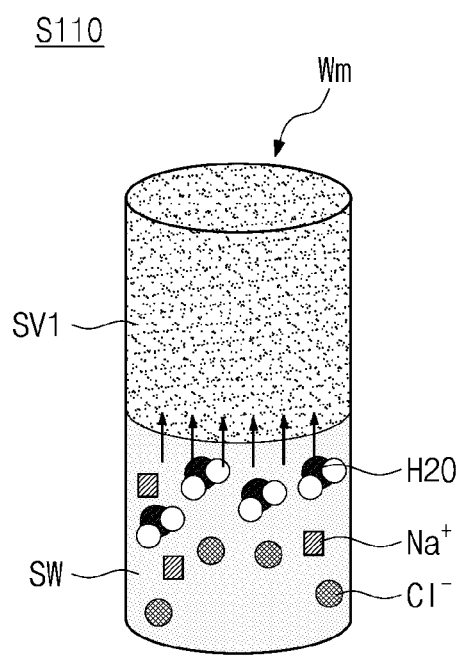

[Fig. 6]
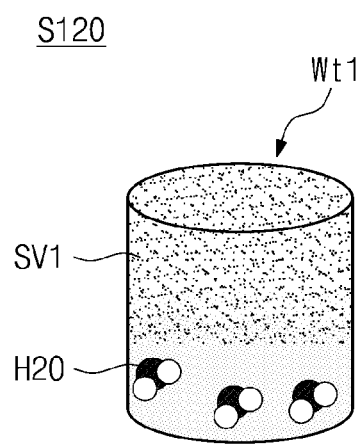

[Fig. 7]
S130~S150
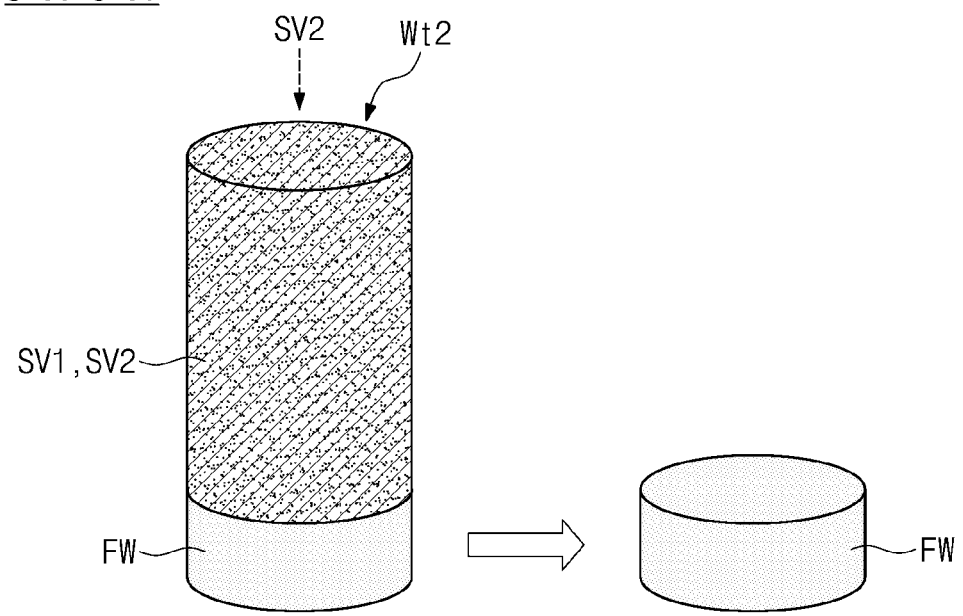

[Fig. 8]
S160, S170
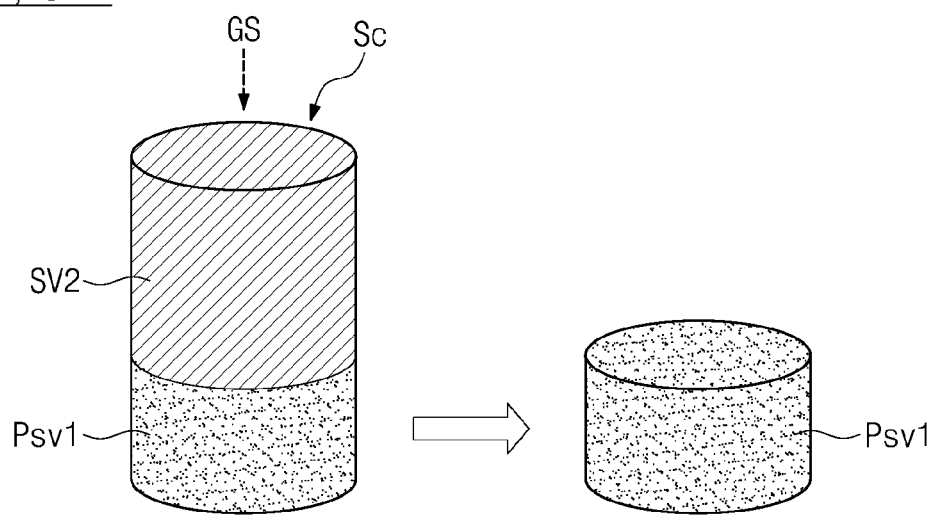

[Fig. 9]
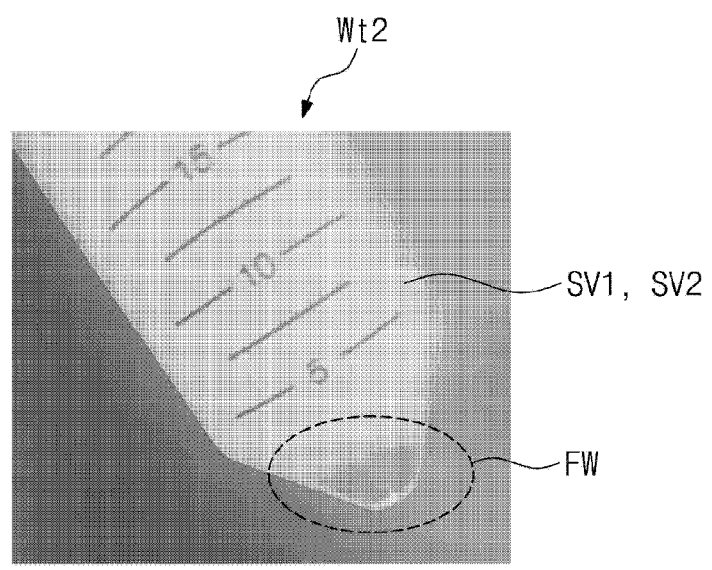

[Fig. 10]
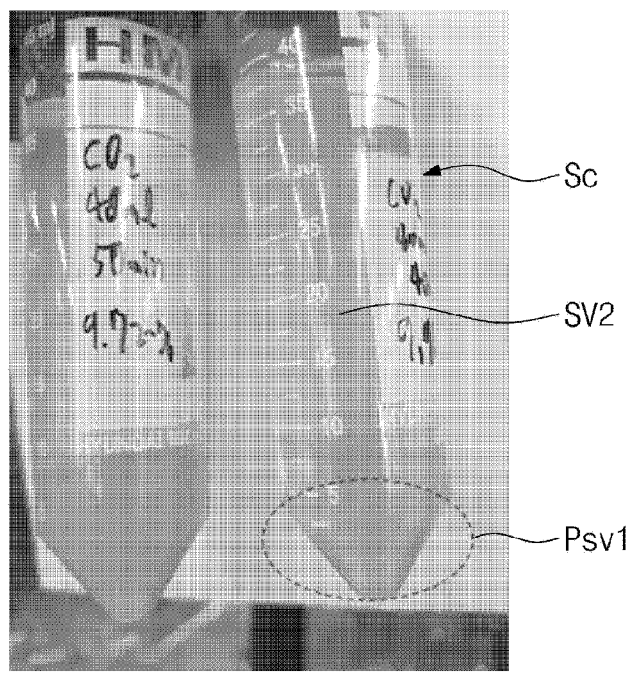

DESALINATION DEVICE USING SOLVENT EXTRACTION METHOD, AND DESALINATION METHOD USING SAME

TECHNICAL FIELD

The present invention relates to a desalination device using a solvent extraction method and a desalination method using the same, and more particularly, to a desalination device using a solvent extraction method without a need for high energy use, and a desalination method using the same.

BACKGROUND ART

Currently, more than 40% of the world's total population suffers from a water scarcity phenomenon, and it is expected that more than 60% of the world's total population will experience a water shortage phenomenon by 2025.

Accordingly, a water treatment method for securing water resources in the long term has been developed all over the world.

Conventionally, as a part of securing water resources, a water treatment method for desalinating seawater or subjecting industrial wastewater to water treatment for water available for use. For example, for the conventional water treatment method, a distillation method, a reverse osmosis method, etc. are used.

However, the conventional water treatment method described above, that is, the distillation method, the reverse osmosis method, etc., have problems of using high energy such as heat treatment and requiring expensive equipment and process costs.

Accordingly, in order to solve the conventional problems as described above, there is a need for a water treatment device and a water treatment method using the same, which do not use high energy while reducing equipment and process costs.

DISCLOSURE

Technical Problem

One technical object of the present invention is to provide a desalination device using a solvent extraction method without a need for high energy use, and a desalination method using the same.

Another technical object of the present invention is to provide a desalination device using a solvent extraction method with minimized occurrence of wastes, and a desalination method using the same.

The technical objects of the present invention are not limited to the above.

Technical Solution

To solve the above technical objects, the present application may provide a desalination device using a solvent extraction method.

According to one embodiment, the desalination device using a solvent extraction method may include: a first mixing tank composed of a feed water inlet into which feed water containing salt ions and water molecules flows, a first solvent inlet into which a first solvent selectively reacting more with the water molecules than with the salt ions flows, a first mixing tank body in which the feed water and the first solvent are mixed so as to form a mixed water, and a mixed water outlet through which the mixed water is discharged; a first separation tank composed of a mixed water inlet which communicates with the mixed water outlet so that the mixed water flows therein, a first separation tank body in which brine containing salt ions of the feed water and first treatment water formed from mixing the water molecules of the feed water and the first solvent of the mixed water are separated by layer, and a first treatment water outlet through which the first treatment water is discharged; a second mixing tank composed of a first treatment water inlet which communicates with the first treatment water outlet so that the first treatment water flows therein, a second solvent inlet into which a second solvent selectively reacting more with the first solvent than with the water molecules of the treatment water flows, a second mixing tank body in which the first treatment water and the second solvent are mixed so as to form second treatment water, and a second treatment water outlet through which the second treatment water is discharged; and a second separation tank composed of a second treatment water inlet which communicates with the second treatment water outlet so that the second treatment water flows therein, a second separation tank body in which the water molecules of the first treatment water and a composite solvent formed from mixing the first solvent of the first treatment water and the second solvent of the second treatment water are separated by layer, and a fresh water outlet through which fresh water composed of the water molecules is discharged.

According to one embodiment, the second separation tank may further include a composite solvent outlet through which the composite solvent is discharged, and further includes a precipitation tank composed of a composite solvent inlet which communicates with the complex solvent outlet so that the complex solvent flows therein, a separation gas inlet into which separation gas selectively binding with the first solvent flows, a precipitation tank body in which a first solvent precipitate formed from selectively binding the first solvent of the composite solvent with the separation gas and the second solvent of the composite solvent are separated by layer, and a first solvent precipitate outlet through which the first solvent precipitate is discharged.

According to one embodiment, the second separation tank may further include a storage tank composed of a first solvent precipitate inlet which communicates with the first solvent precipitate outlet so that the first solvent precipitate flows therein, a storage tank body in which the first solvent from which the separation gas of the first solvent precipitate is removed is stored, and a first solvent outlet which communicates with the first solvent inlet of the first mixing tank so that the first solvent stored in the storage tank body is discharged to the first mixing tank body, in which the first solvent discharged from the first solvent outlet flows into the first mixing tank and reused.

According to one embodiment, the precipitation tank may further include a second solvent outlet through which the composite solvent is discharged, in which the second solvent outlet communicates with the second solvent inlet, and the second solvent discharged from the second solvent outlet flows into the second mixing tank and reused.

According to one embodiment, the precipitation tank body may have a pH adjusted to more than 9.0 by the separation gas.

According to one embodiment, a volume ratio of the first solvent and the second solvent of the second mixing tank body may be 1:1 or more and 1:2 or less.

According to one embodiment, the first separation tank may further include a brine outlet through which the brine is discharged, in which the brine outlet communicates with the feed water inlet, and the brine discharged from the brine outlet flows into the first mixing tank and reused.

According to one embodiment, the first solvent may be any one selected from the group consisting of dipropylamine, ethylheptylamine, and ethylbutylamine, and the second solvent may be any one selected from the group consisting of octanol, nonanol and decanol and from the group of vegetable oils including soybean oil, palm oil, canola oil and coconut oil.

To solve the above technical objects, the present application may provide a desalination method using a solvent extraction method.

According to one embodiment, the desalination method using a solvent extraction method may include: a mixed water forming step of forming a mixed water by mixing feed water containing salt ions and water molecules with a first solvent selectively reacting more with the water molecules than with the salt ions; a first separating step of allowing brine containing salt ions of the feed water and first treatment water formed from mixing the water molecules of the feed water and the first solvent of the mixed water to be separated by layer; a second treatment water forming step of forming a second treatment water by mixing the first treatment water with a second solvent selectively reacting more with the first solvent than with the water molecules of the treatment water; a second separating step of allowing the water molecules of the first treatment water and a composite solvent formed from mixing the first solvent of the first treatment water and the second solvent of the second treatment water to be separated by layer; and a fresh water discharging step of allowing freshwater composed of the water molecules to be discharged.

According to one embodiment, the desalination method using a solvent extraction method may further include: a separation gas providing step of providing separation gas selectively binding with the first solvent to the composite solvent; and a precipitating step of allowing a first solvent precipitate formed from selectively binding the first solvent of the composite solvent with the separation gas and the second solvent of the composite solvent to be separated by layer.

According to one embodiment, the desalination method using a solvent extraction method may further include: a first solvent reusing step of recycling and reusing the first solvent from which the separation gas of the first solvent precipitate is removed through the mixed water forming step.

According to one embodiment, the desalination method using a solvent extraction method may further include: a second solvent reusing step of recycling and reusing the second solvent through the second treatment water forming step.

According to one embodiment, the desalination method using a solvent extraction method may further include: a brine reusing step of recycling and reusing the brine through the mixed water forming step.

Advantageous Effects

According to an embodiment, there may be provided a desalination device using a solvent extraction method, including: a first mixing tank composed of a feed water inlet into which feed water containing salt ions and water molecules flows, a first solvent inlet into which a first solvent selectively reacting more with the water molecules than with the salt ions flows, a first mixing tank body in which the feed water and the first solvent are mixed so as to form a mixed water, and a mixed water outlet through which the mixed water is discharged; a first separation tank composed of a mixed water inlet which communicates with the mixed water outlet so that the mixed water flows therein, a first separation tank body in which brine containing salt ions of the feed water and first treatment water formed from mixing the water molecules of the feed water and the first solvent of the mixed water are separated by layer, and a first treatment water outlet through which the first treatment water is discharged; a second mixing tank composed of a first treatment water inlet which communicates with the first treatment water outlet so that the first treatment water flows therein, a second solvent inlet into which a second solvent selectively reacting more with the first solvent than with the water molecules of the treatment water flows, a second mixing tank body in which the first treatment water and the second solvent are mixed so as to form second treatment water, and a second treatment water outlet through which the second treatment water is discharged; and a second separation tank composed of a second treatment water inlet which communicates with the second treatment water outlet so that the second treatment water flows therein, a second separation tank body in which the water molecules of the first treatment water and a composite solvent formed from mixing the first solvent of the first treatment water and the second solvent of the second treatment water are separated by layer, and a fresh water outlet through which fresh water composed of the water molecules is discharged.

Accordingly, the desalination device performs desalination through the above-described solvent extraction method, thereby providing an economic advantage over the conventional water treatment method using high energy.

Furthermore, according to an embodiment of the present invention, the first solvent, the second solvent, and the brine can be recycled and reused to minimize the occurrence of wastes and maximize an economic advantage.

DESCRIPTION OF DRAWINGS

FIGS. 1 and 2 are views for explaining a desalination device according to an embodiment of the present invention.

FIGS. 3 to 8 are views for explaining a desalination method according to an embodiment of the present invention.

FIGS. 9 to 10 are views for explaining an experimental example of the present invention.

MODE FOR INVENTION

Hereinafter, exemplary embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

In the specification herein, when one component is mentioned as being on other component, it signifies that the one component may be placed directly on the other component or a third component may be interposed therebetween. In addition, in drawings, thicknesses of layers and areas may be exaggerated to effectively describe the technology of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, in the following description of the embodiments of the present invention, the detailed description of known functions and configurations incorporated herein will be omitted when it possibly makes the subject matter of the present invention unclear unnecessarily.

Hereinafter, a desalination device according to an embodiment of the present invention will be described with reference to the drawings.

The desalination device according to an embodiment of the present invention to be described below may be a device for desalinating seawater or industrial wastewater through a solvent extraction method.

Accordingly, according to an embodiment of the present invention, there is no need to use high energy unlike a water treatment method using high energy, such as the conventional water treatment method, that is, a distillation method, a reverse osmosis method, etc. In addition, there is an economic advantage of reducing equipment and process costs.

FIGS. 1 and 2 are views for explaining a desalination device according to an embodiment of the present invention.

Referring to FIGS. 1 and 2, the desalination device 1000 may include a first solvent tank 100, a feed water tank 200, a second solvent tank 300, a freshwater tank 400, a first mixing tank 500, a first separation tank 600, a second mixing tank 700, a second separation tank 800, a precipitation tank 900, and a storage tank 950.

Hereinafter, each configuration will be described in detail.

First Solvent Tank 100

A first solvent SV1 may be stored in the first solvent tank 100.

For this purpose, the first solvent tank 100 may be configured to include at least one of a first solvent tank inlet (not shown), a first solvent tank body (not shown), and a first solvent tank outlet (not shown).

The first solvent SV1 may flow in through the first solvent tank inlet (not shown).

The first solvent SV1 flowing in through the first solvent tank inlet may be stored in the first solvent tank body (not shown).

The first solvent SV1 of the first solvent tank body may be discharged through the first solvent tank outlet (not shown).

Meanwhile, unlike the above, according to one embodiment, the first solvent tank 100 may be omitted.

In this case, the first solvent SV1 may directly flow into the first mixing tank 500 to be described later.

The first solvent SV1 may be a solvent selectively reacting more with water molecules $H_2O$ than with salt ions. For example, the first solvent SV1 may be any one selected from the group consisting of dipropylamine, ethylheptylamine, and ethylbutylamine.

In addition, the salt ion herein may be understood as a concept including at least one of a sodium ion (Na+) and a chloride ion (Cl−). Hereinafter, it may be assumed that the salt ion is a sodium ion (Na+) and a chloride ion (Cl−).

Feed Water Tank 200

Feed water SW may be stored in the feed water tank 200.

For this purpose, the feed water tank 200 may be configured to include at least one of a feed water tank inlet (not shown), a feed water tank body (not shown), and a feed water tank outlet (not shown).

The feed water SW may flow in through the feed water tank inlet (not shown).

The feed water SW flowing in through the feed water tank inlet may be stored in the feed water tank body (not shown).

The feed water SW of the feed water tank body may be discharged through the feed water tank outlet (not shown).

Meanwhile, unlike the above, according to one embodiment, the feed water tank 200 may be omitted.

In this case, the feed water SW may directly flow into the first mixing tank 500 to be described later.

The feed water SW may be water containing the above-described salt ions (Na+, Cl−) and water molecules $H_2O$. For example, the feed water SW may be seawater or industrial wastewater containing the salt ions (Na+, Cl−) and water molecules $H_2O$.

First Mixing Tank 500

In the first mixing tank 500, the first solvent SV1 and the feed water SW may be mixed to form mixed water Wm.

For this purpose, the first mixing tank 500 may be configured to include at least one of a feed water inlet (not shown), a first solvent inlet (not shown), a first mixing tank body (not shown), and a mixed water outlet (not shown).

The feed water SW may flow in through the feed water inlet (not shown).

As described above, when the first solvent tank 100 is included in a desalination device 1000 according to one embodiment, the first solvent inlet may communicate with the first solvent tank outlet.

Accordingly, the first solvent SV1 may flow into the first mixing tank body through the first solvent inlet.

The first solvent SV1 may flow in through the first solvent inlet (not shown).

As described above, when the feed water tank 200 is included in the desalination device 1000 according to one embodiment, the feed water inlet may communicate with the feed water tank outlet.

Accordingly, the feed water SW may flow into the first mixing tank body through the feed water inlet.

Meanwhile, unlike the above, according to one embodiment, when the first solvent tank 100 and the feed water tank 200 are omitted, the first solvent SV1 may pass through the first solvent inlet, and the feed water SW may directly flow into the first mixing tank body through the feed water inlet.

In the first mixing tank body (not shown), as shown in FIG. 2, the feed water SW flowing in through the feed water inlet and the first solvent SV1 flowing in through the first solvent inlet may be mixed to form mixed water Wm.

The mixed water Wm may be discharged through the mixed water outlet (not shown).

First Separation Tank 600

In the first separation tank 600, brine containing salt ions (Na+, Cl−) of the feed water SW and first treatment water Wt1 formed from mixing the water molecules $H_2O$ of the feed water SW and the first solvent SV1 of the mixed water Wm may be separated by layer.

For this purpose, the first separation tank 600 may be configured to include at least one of a mixed water inlet (not shown), a first separation tank body (not shown), a first treatment water outlet (not shown), and a brine outlet (not shown).

The mixed water Wm may flow in through the mixed water inlet (not shown).

For this purpose, the mixed water inlet may communicate with the mixed water outlet of the first mixing tank 500.

The mixed water Wm flowing in through the mixed water inlet may be separated by layer in the first separation tank body (not shown).

More specifically, as described above, the first solvent SV1 may selectively react more with water molecules ($H_2O$) than with salt ions. Accordingly, in the first separation tank 600, as shown in FIG. 2, first treatment water Wt1 formed from mixing the first solvent SV1 of the mixed water Wm and the water molecules $H_2O$ of the feed water SW and brine containing salt ions ($Na+$, $Cl-$) of the feed water SW may be separated by layer.

The first treatment water Wt1 may be discharged through the first treatment water outlet (not shown).

The brine may be discharged through the brine outlet (not shown).

In this case, the brine discharged from the brine solvent outlet may flow into the first mixing tank 500 and may be first reused RU1.

For this purpose, the brine outlet may communicate with at least one of the feed water inlet of the feed water tank 200 and the feed water inlet of the first mixing tank 500.

Second Mixing Tank 700

In the second mixing tank 700, the first treatment water Wt1 and the second solvent SV2 may be mixed to form a second treatment water Wt2.

For this purpose, the second mixing tank 700 may be configured to include at least one of a first treatment water inlet (not shown), a second solvent inlet (not shown), a second mixing tank body (not shown), and a second treatment water outlet (not shown).

The first treatment water Wt1 may flow in through the first treatment water inlet (not shown).

For this purpose, the first treatment water inlet may communicate with the first treatment water outlet of the first separation tank 600.

The second solvent SV2 may flow in through the second solvent inlet (not shown).

For this purpose, according to one embodiment, a second solvent tank 300 in which the second solvent SV2 is stored may be further provided. The second solvent tank 300 may be described later.

In the second mixing tank body (not shown), as shown in FIG. 2, the first treatment water Wt1 flowing in through the first treatment water inlet and the second solvent SV2 flowing in through the second solvent tank inlet may be mixed to form the second treatment water Wt2.

In this case, according to an embodiment of the present invention, a volume ratio of the first solvent SV1 and the second solvent SV2 of the second mixing tank body may be 1:1 or more and 1:2 or less. Accordingly, according to an embodiment of the present invention, a recovery rate of fresh water FW and a rejection rate of salt ions ($Na+$, $Cl-$) may be maximized. In this regard, reference will be made to the experimental examples of the present invention to be described later.

The second treatment water Wt2 may be discharged through the second treatment water outlet (not shown).

Second Solvent Tank 300

According to one embodiment, a second solvent SV2 may be stored in the second solvent tank 300.

For this purpose, the second solvent tank 300 may be configured to include at least one of a second solvent tank inlet (not shown), a second solvent tank body (not shown), and a second solvent tank outlet (not shown).

The second solvent SV2 may flow in through the second solvent tank inlet (not shown).

The second solvent SV2 flowing in through the second solvent tank inlet may be stored in the second solvent tank body (not shown).

The second solvent SV2 of the second solvent tank body may be discharged to the second solvent inlet of the second mixing tank 700 through the second solvent tank outlet (not shown).

For this purpose, the second solvent tank outlet may communicate with the second solvent inlet.

Meanwhile, unlike the above, according to one embodiment, the second solvent tank 300 may be omitted. In this case, the second solvent SV1 may directly flow into the second mixing tank 700.

The second solvent SV2 may be a solvent selectively reacting more with the first solvent SV1 than with water molecules $H_2O$. For example, the second solvent SV2 may be anyone selected from the group consisting of octanol, nonanol and decanol and from the group of vegetable oils including soybean oil, palm oil, canola oil and coconut oil.

Second Separation Tank 800

In the second separation tank 800, the water molecules $H_2O$ of the first treatment water Wt1 and a composite solvent Sc formed from mixing the first solvent SV1 of the first treatment water Wt1 and the second solvent Sv2 of the second treatment water Wt2 may be separated by layer.

For this purpose, the second separation tank 800 may be configured to include at least one of a second treatment water inlet (not shown), a second separation tank body (not shown), a composite solvent outlet (not shown), and a fresh water outlet (not shown).

The second treatment water Wt2 may flow in through the second treatment water inlet (not shown).

For this purpose, the second treatment water inlet (not shown) may communicate with the second treatment water outlet of the second mixing tank 700.

The second treatment water Wt2 flowing in through the second treatment water inlet may be separated by layer in the second separation tank body (not shown).

More specifically, as described above, the second solvent SV2 may selectively react more with the first solvent SV1 than with water molecules $H_2O$. Accordingly, in the second separation tank 800, as shown in FIG. 2, a composite solvent Sc formed from mixing the second solvent SV2 of the second treatment water Wt2 and the first solvent SV1 of the first treatment water Wt1, and the water molecules $H_2O$ of the first treatment water Wt1 may be separated by layer.

The composite solvent Sc may be discharged through the composite solvent outlet (not shown).

The fresh water FW containing the water molecules $H_2O$ may be discharged through the fresh water outlet (not shown).

By doing so, the desalination device according to an embodiment of the present invention may desalinate seawater or industrial wastewater through a solvent extraction method.

Accordingly, according to an embodiment of the present invention, as described above, there is no need to use high energy unlike a water treatment method using high energy, such as the conventional water treatment method, that is, a distillation method, a reverse osmosis method, etc. In addition, there is an economic advantage of reducing equipment and process costs.

Fresh Water Tank 400

According to one embodiment, a fresh water tank 400 in which the fresh water FW is stored may be further provided.

The fresh water tank 400 may be configured to include at least one of a fresh water tank inlet (not shown), a fresh water tank body (not shown), and a fresh water tank outlet (not shown).

The fresh water FW may flow in through the fresh water inlet (not shown).

For this purpose, the fresh water inlet may communicate with the fresh water outlet of the second separation tank 800.

The freshwater FW flowing in through the freshwater tank inlet may be stored in the fresh water tank body (not shown).

The freshwater FW of the freshwater tank body may be discharged through the fresh water tank outlet (not shown).

Meanwhile, according to an embodiment of the present invention, the brine separated by layer in the first separation tank 600 described above and discharged from the brine outlet may flow into the first mixing tank 500 and may be first reused RU1 so as to circulate and recycle resources, thereby minimizing the occurrence of wastes and maximizing an economic advantage.

In other words, the desalination device 1000 according to an embodiment of the present invention, as described above, may perform desalination through the solvent extraction method, thereby providing an economic advantage over the conventional water treatment method using high energy, and may also circulate and recycle resources, thereby minimizing the occurrence of wastes and maximizing an economic advantage.

For this purpose, the desalination device 1000 according to an embodiment of the present invention may further include at least one of the precipitation tank 900 and the storage tank 950.

Hereinafter, each configuration of the device of the present invention for resource recycling and reuse will be described.

Precipitation Tank 900

In the precipitation tank 900, a first solvent precipitate Psv1 formed from selectively binding the first solvent SV1 of the composite solvent Sc with the separation gas GS and the second solvent SV2 of the composite solvent Sc may be separated by layer.

For this purpose, the precipitation tank 900 may be configured to include at least one of a composite solvent inlet (not shown), a separation gas inlet (not shown), a precipitation tank body (not shown), a first solvent precipitation outlet (not shown), and a second solvent outlet (not shown).

The composite solvent Sc may flow in through the composite solvent inlet (not shown).

For this purpose, the composite solvent inlet may communicate with the composite solvent outlet of the second separation tank 800.

The separation gas GS may flow in through the separation gas inlet (not shown).

For this purpose, according to one embodiment, a separation gas storage part 450 in which the separation gas GS is stored may be further provided. The separation gas storage part 450 may be described later.

In the precipitation tank body (not shown), the first solvent SV1 and the second solvent SV2 may be separated by layer.

More specifically, as described above, the separation gas GS may selectively bind with the first solvent SV1. Accordingly, in the precipitation tank body, as shown in FIG. 2, the first solvent precipitate Psv1 formed from selectively binding the first solvent SV1 of the composite solvent Sc with the separation gas GS, and the second solvent SV2 of the composite solvent Sc may be separated by layer.

The first solvent precipitate Psv1 may be discharged through the first solvent precipitate outlet (not shown).

The second solvent SV2 may be discharged through the second solvent outlet (not shown).

In this case, the solvent SV2 discharged from the second solvent outlet may flow into the second mixing tank 700 and may be second reused RU2.

For this purpose, the second solvent outlet may communicate with at least one of the second solvent tank inlet of the second solvent tank 300 and the second solvent inlet of the second mixing tank 700.

Separation Gas Storage Part 450

According to one embodiment, separation gas GS may be stored in the separation gas storage part 450.

For this purpose, the separation gas storage part 450 may be configured to include at least one of a separation gas storage part inlet (not shown), a separation gas storage part body (not shown), and a separation gas storage part outlet (not shown).

The separation gas GS may flow in through the separation gas storage part inlet (not shown).

The separation gas GS flowing in through the separation gas storage part inlet may be stored in the separation gas storage part body (not shown).

The separation gas GS of the separation gas storage part body may be discharged to the separation gas inlet of the precipitation tank 900 through the separation gas storage part outlet (not shown).

For this purpose, the separation gas storage part outlet may communicate with the separation gas inlet.

Meanwhile, unlike the above, according to one embodiment, the separation gas storage part 450 may be omitted. In this case, the separation gas GS may directly flow into the precipitation tank 900.

The separation gas GS may be a gas selectively binding with the first solvent SV1. For example, the separation gas GS may be carbon dioxide $CO_2$.

Meanwhile, the pH of the precipitation tank body may be adjusted by the separation gas GS. According to an embodiment of the present invention, the precipitation tank body may have the pH adjusted to more than 9.0 by the separation gas GS. Accordingly, according to an embodiment of the present invention, a separation efficiency of the first solvent SV1 and the second solvent SV2 by the separation gas GS may be maximized. In this regard, reference will be made to the experimental examples of the present invention to be described later.

Storage Tank 950

The first solvent SV1 from which the separation gas GS of the first solvent precipitate Psv1 is removed may be stored in the storage tank 950.

For this purpose, the storage tank 950 may include at least one of a first solvent precipitate inlet (not shown), a storage tank body (not shown), and a first solvent outlet (not shown).

The first solvent precipitate Psv1 may flow in through the first solvent precipitate inlet (not shown).

For this purpose, the first solvent precipitate inlet may communicate with the first solvent precipitate outlet of the precipitation tank 900.

The first solvent SV1 may be stored in the storage body (not shown).

For this purpose, the separation gas GS of the first solvent precipitate Psv1 flowing in through the first solvent precipitate inlet may be removed in the first storage body (not shown).

Accordingly, the first solvent SV1 from which the separation gas GS of the first solvent precipitate Psv1 is removed may be stored in the storage tank body (not shown).

Meanwhile, a degassing process may be performed to remove the separation gas GS from the first solvent precipitate Psv1.

The first solvent SV1 may be discharged through the first solvent outlet (not shown).

In this case, the first solvent SV1 discharged from the first solvent outlet may flow into the first mixing tank 500 and may be third reused RU3.

For this purpose, the first solvent outlet may communicate with at least one of the first solvent tank inlet of the feed water tank 100 and the first solvent inlet of the first mixing tank 500.

The desalination device 1000 according to an embodiment of the present invention has been described above.

As described above, the desalination device 1000 may perform desalination through the solvent extraction method, thereby providing an economic advantage over the conventional water treatment method using high energy.

Furthermore, as shown in the first reuse RU1 to the third reuse RU2 as above, the device may also circulate and recycle resources, thereby minimizing the occurrence of wastes and maximizing an economic advantage.

Hereinafter, a desalination method according to an embodiment of the present invention will be described with reference to the drawings.

The desalination method according to an embodiment of the present invention to be described later may be understood as a concept including a method of desalinating seawater or industrial wastewater through the solvent extraction method using the desalination device 100.

FIGS. 3 to 8 are views for explaining a desalination method according to an embodiment of the present invention.

With reference to FIGS. 3 and 4, the desalination method may include at least one of a mixed water forming step S110, a first separating step S120, a second treatment water forming step S130, a second separating step S140, a fresh water discharging step S150, a separation gas providing step S160, and a precipitating step S170.

Hereinafter, each step will be described in detail.

Hereinafter, descriptions overlapping with the above-described desalination device 1000 will be omitted.

Step S110

In step S110, the mixed water Wm may be formed as shown in FIG. 5.

More specifically, in the first mixing tank 500, the feed water SW containing the salt ions (Na+, Cl−) and the water molecules $H_2O$ may be mixed with the first solvent SV1 selectively reacting more with the water molecules ($H_2O$) than with the salt ions (Na+, Cl−) so as to form the mixed water Wm.

For this purpose, the first mixing tank 500 may be also configured to include at least one of a feed water inlet (not shown), a first solvent inlet (not shown), a first mixing tank body (not shown), and a mixed water outlet (not shown).

For each configuration, descriptions overlapping with the above-described desalination device 1000 will be omitted.

Step S120

In step S120, a first separation, in which the first treatment water Wt1 is separated by layer, may be performed as shown in FIG. 6.

More specifically, in the first separation tank 600, brine containing salt ions (Na+, Cl−) of the feed water SW and first treatment water Wt1 formed from mixing the water molecules $H_2O$ of the feed water SW and the first solvent SV1 of the mixed water Wm may be separated by layer.

As described above, the first solvent SV1 may selectively react more with water molecules ($H_2O$) than with salt ions. Accordingly, in the first separation tank 600, first treatment water Wt1 formed from mixing the first solvent SV1 of the mixed water Wm and the water molecules $H_2O$ of the feed water SW and brine containing salt ions (Na+, Cl−) of the feed water SW may be separated by layer.

For this purpose, the first separation tank 600 may be configured to include at least one of a mixed water inlet (not shown), a first separation tank body (not shown), a first treatment water outlet (not shown), and a brine outlet (not shown).

For each configuration, descriptions overlapping with the above-described desalination device 1000 will be omitted.

Meanwhile, as described above, the brine separated in this step may flow into the first mixing tank 500 of the above-described step S110 and be also first reused (RU1, see FIGS. 1 and 2).

For this purpose, the brine outlet of the first separation tank 600 may communicate with at least one of the feed water inlet of the feed water tank 200 and the feed water inlet of the first mixing tank 500.

Step S130

In step S130, the second treatment water Wt2 may be formed as shown in FIG. 7.

More specifically, in the second mixing tank 700, the first treatment water Wt1 and the second solvent SV2 may be mixed to form the second treatment water Wt2.

For this purpose, the second mixing tank 700 may be configured to include at least one of a first treatment water inlet (not shown), a second solvent inlet (not shown), a second mixing tank body (not shown), and a second treatment water outlet (not shown).

For each configuration, descriptions overlapping with the above-described desalination device 1000 will be omitted.

Step S140

In step S140, a second separation, in which the second treatment water Wt2 is separated by layer, may be performed as shown in FIG. 7.

More specifically, in the second separation tank 800, the water molecules $H_2O$ of the first treatment water Wt1 and a composite solvent Sc formed from mixing the first solvent SV1 of the first treatment water Wt1 and the second solvent Sv2 of the second treatment water Wt2 may be separated by layer.

As described above, the second solvent SV2 may selectively react more with the first solvent SV1 than with water molecules $H_2O$. Accordingly, in the second separation tank 800, a composite solvent Sc formed from mixing the second solvent SV2 of the second treatment water Wt2 and the first solvent SV1 of the first treatment water Wt1, and the water molecules $H_2O$ of the first treatment water Wt1 may be separated by layer.

For this purpose, the second separation tank 800 may be configured to include at least one of a second treatment water inlet (not shown), a second separation tank body (not shown), a freshwater outlet (not shown), and a composite solvent outlet (not shown).

For each configuration, descriptions overlapping with the above-described desalination device 1000 will be omitted.

Step S150

In step S150, the fresh water FW may be discharged as shown in FIG. 7.

More specifically, the fresh water FW containing the water molecules $H_2O$ separated by layer in the second separation tank 800 may be discharged through the previous step S140.

According to one embodiment, the fresh water FW may be stored in the fresh water tank 400 as described above.

For this purpose, the fresh water tank 400 may be configured to include at least one of a fresh water tank inlet (not shown), a freshwater tank body (not shown), and a freshwater tank outlet (not shown).

For each configuration, descriptions overlapping with the above-described desalination device 1000 will be omitted.

By doing so, seawater or industrial wastewater may be desalinated through the solvent extraction method according to steps S110 to S150 of the present invention described above.

Accordingly, according to an embodiment of the present invention, as described above, there is no need to use high energy unlike a water treatment method using high energy, such as the conventional water treatment method, that is, a distillation method, a reverse osmosis method, etc. In addition, there is an economic advantage of reducing equipment and process costs.

Steps S160 and S170

As shown in FIG. 8, the separation gas GS may be provided to the composite solvent Sc in step S160, and the first solvent precipitate Psv1 and the second solvent SV2 may be separated by layer in step S170.

More specifically, in the precipitation tank 900, a first solvent precipitate Psv1 formed from selectively binding the first solvent SV1 of the composite solvent Sc with the separation gas GS and the second solvent SV2 of the composite solvent Sc may be separated by layer.

As described above, the separation gas GS may selectively bind with the first solvent SV1. Accordingly, in the precipitation tank 900, the first solvent precipitate Psv1 formed from selectively binding the first solvent SV1 of the composite solvent Sc with the separation gas GS, and the second solvent SV2 of the composite solvent Sc may be separated by layer.

For this purpose, the precipitation tank 900 may be configured to include at least one of a composite solvent inlet (not shown), a separation gas inlet (not shown), a precipitation tank body (not shown), a first solvent precipitation outlet (not shown), and a second solvent outlet (not shown).

For each configuration, descriptions overlapping with the above-described desalination device 1000 will be omitted.

Meanwhile, as described above, the second solvent SV2 separated in this step may flow into the second mixing tank 700 of the above-described step S130 and be also second reused (RU2, see FIGS. 1 and 2).

For this purpose, the second solvent outlet of the precipitation tank 900 may communicate with at least one of the second solvent tank inlet of the second solvent tank 300 and the second solvent inlet of the second mixing tank 700.

In addition, in this step as described above, the first solvent SV1 from which the separation gas GS of the first solvent precipitate Psv1 is removed may be stored in the storage tank 950 and may flow into the first mixing tank 500 of the above-described step S110 and be also third reused (RU3, see FIGS. 1 and 2).

For this purpose, the storage tank 950 may include at least one of a first solvent precipitate inlet (not shown), a storage tank body (not shown), and a first solvent outlet (not shown).

In addition, the first solvent outlet of the storage tank 950 may communicate with at least one of the first solvent tank inlet of the feed water tank 100 and the first solvent inlet of the first mixing tank 500.

Hereinafter, an experimental example of the present invention will be described with reference to the drawings.

FIGS. 9 to 10 are views for explaining an experimental example of the present invention.

Preparing of Second Treatment Water According to Experimental Example 1-1

The feed water SW containing the salt ions (Na+, Cl−) and the water molecules $H_2O$ were mixed with the first solvent SV1 so as to form the mixed water Wm.

The first treatment water Wt1 formed from mixing the first solvent SV1 of the mixed water Wm and the water molecules $H_2O$ of the feed water SW and brine containing salt ions (Na+, Cl−) of the feed water SW were separated by layer.

The first treatment water Wt1 and the second solvent SV2 were mixed so that a volume ratio of the first solvent SV1 and the second solvent SV2 might become 1:0.5, thereby preparing the second treatment water Wt2 according to Experimental Example 1-1.

Preparing of Second Treatment Water According to Experimental Example 1-2

In Experimental Example 1-1 described above, mixing was performed so that a volume ratio of the first solvent SV1 and the second solvent SV2 might become 1:1, thereby preparing the second treatment water Wt2 according to Experimental Example 1-2.

Preparing of Second Treatment Water According to Experimental Example 1-3

In Experimental Example 1-1 described above, mixing was performed so that a volume ratio of the first solvent SV1 and the second solvent SV2 might become 1:1.5, thereby preparing the second treatment water Wt2 according to Experimental Example 1-3.

Preparing of Second Treatment Water According to Experimental Example 1-4

In Experimental Example 1-1 described above, mixing was performed so that a volume ratio of the first solvent SV1 and the second solvent SV2 might become 1:2, thereby preparing the second treatment water Wt2 according to Experimental Example 1-4.

The second treatment water (Wt2) according to Experimental Examples 1-1 to 1-4 described above was prepared, and a composite solvent Sc formed from mixing the second solvent SV2 of the second treatment water Wt2 and the first solvent SV1 of the first treatment water Wt1, and the fresh water FW containing the water molecules $H_2O$ of the first treatment water Wt1 may be separated by layer.

With respect to the second treatment water Wt2 according to Experimental Examples 1-1 to 1-4 described above, a water recovery of the fresh water FW was calculated through <Equation 1> and a Cl rejection of Cl− ions was calculated through <Equation 2>.

$$(\text{Volume of produced water}/\text{Volume of Feedstock}) \times 100 \quad <\text{Equation 1}>$$

$$(\text{Residual mass of Cl}^- \text{ in the brine}/\text{Initial mass of Cl}^- \text{ in the feedstock}) \times 100 \quad <\text{Equation 2}>$$

Experimental Examples 1-1 to 1-4 Described Above May be Summarized as Shown in <Table 1> Below

TABLE 1

|  | Volume ratio | Water recovery (%) | | Cl Rejection (%) | |
| --- | --- | --- | --- | --- | --- |
|  |  | Soybean Oil | Decanol | Soybean Oil | Decanol |
| Experimental Example 1-1 | 1:0.5 | 4.40 | 3.50 | 92.73 | 68.25% |
| Experimental Example 1-2 | 1:1.0 | 7.33 | 4.50 | 92.97 | 76.84% |
| Experimental Example 1-3 | 1:1.5 | 8.20 | 5.20 | 93.50 | 77.36% |
| Experimental Example 1-4 | 1:2.0 | 7.60 | 0.80 | 90.77 | 50.12% |

Referring to above <Table 1>, in case of Experimental Example 1-3, it can be seen that the water recovery of the fresh water FW and the Cl rejection of salt ions (Cl−) are the best.

Accordingly, as in Experimental Example 1-3 of the present invention, in case of preparing the second treatment water Wt2 so that the volume ratio of the first solvent SV1 and the second solvent SV2 is 1:1.5, it can be seen that the water recovery of the fresh water (FW) and the Cl rejection of the salt ions (Cl−) are maximized.

In addition, also through FIG. 9, it can be confirmed that a composite solvent Sc formed from mixing the first solvent SV1 of the second treatment water Wt2 and the second solvent SV2, and the fresh water FW containing the water molecules $H_2O$ are separated by layer.

Separation of First Solvent SV1 and Second Solvent SV2 According to Experimental Example 2

In Experimental Example 1-3 described above, based on 40 mL of the composite solvent Sc, carbon dioxide was injected as the separation gas GS at a flow rate of 100 mL/min for 5 to 10 minutes with a pH adjusted to 9.3 to 9.6, and thus the first solvent precipitate Psv1 formed from selectively binding the first solvent SV1 with the separation gas GS, and the second solvent SV2 were separated by layer.

As described above, the separation gas GS may selectively bind with the first solvent SV1. Accordingly, as shown in FIG. 10, the first solvent precipitate Psv1 formed from selectively binding the first solvent SV1 of the composite solvent Sc with the separation gas GS, and the second solvent SV2 of the composite solvent Sc may be separated by layer.

Meanwhile, according to Experimental Example 2 of the present invention, the pH was adjusted to 9.3 to 9.6 by the separation gas (GS). Accordingly, as shown in FIG. 10, it can be seen that the solvent precipitate Psv1 and the second solvent SV2 are separated by layer without gelatinization of the composite solvent Sc.

In contrast, when the pH is adjusted to 9.0 or less by the separation gas, the viscosity of the composite solvent may increase to proceed with gelatinization. Accordingly, the first solvent SV1 and the second solvent SV2 may be hardly separated by layer.

However, according to Experimental Example of the present invention, the pH was adjusted to 9.3 to 9.6 by the separation gas (GS). Accordingly, a separation efficiency of the first solvent SV1 and the second solvent SV2 may be maximized without gelatinization as described above.

The invention claimed is:

1. A desalination device using a solvent extraction method, comprising:
a first mixing tank composed of a feed water inlet into which feed water comprising salt ions and water molecules flows, a first solvent inlet into which a first solvent selectively reacting more with the water molecules than with the salt ions flows, a first mixing tank body in which the feed water and the first solvent are mixed so as to form a mixed water, and a mixed water outlet through which the mixed water is discharged;
a first separation tank composed of a mixed water inlet which communicates with the mixed water outlet so that the mixed water flows therein, a first separation tank body in which brine containing salt ions of the feed water and first treatment water formed from mixing the water molecules of the feed water and the first solvent of the mixed water are separated by layer, and a first treatment water outlet through which the first treatment water is discharged;
a second mixing tank composed of a first treatment water inlet which communicates with the first treatment water outlet so that the first treatment water flows therein, a second solvent inlet into which a second solvent selectively reacting more with the first solvent than with the water molecules of the treatment water flows, a second mixing tank body in which the first treatment water and the second solvent are mixed so as to form second treatment water, and a second treatment water outlet through which the second treatment water is discharged; and
and a second separation tank composed of a second treatment water inlet which communicates with the second treatment water outlet so that the second treatment water flows therein, a second separation tank body in which the water molecules of the first treatment water and a composite solvent formed from mixing the first solvent of the first treatment water and the second solvent of the second treatment water are separated by layer, and a fresh water outlet through which fresh water composed of the water molecules is discharged.

2. The desalination device of claim 1, wherein the second separation tank further comprises a composite solvent outlet through which the composite solvent is discharged, and
further comprises a precipitation tank composed of a composite solvent inlet which communicates with the complex solvent outlet so that the complex solvent flows therein, a separation gas inlet into which separation gas selectively binding with the first solvent flows, a precipitation tank body in which a first solvent precipitate formed from selectively binding the first solvent of the composite solvent with the separation gas and the second solvent of the composite solvent are separated by layer, and a first solvent precipitate outlet through which the first solvent precipitate is discharged.

3. The desalination device of claim 2, further comprising: a storage tank composed of a first solvent precipitate inlet which communicates with the first solvent precipitate outlet so that the first solvent precipitate flows therein, a storage tank body in which the first solvent from which the separation gas of the first solvent precipitate is removed is stored, and a first solvent outlet which communicates with the first solvent inlet of the first mixing tank so that the first solvent stored in the storage tank body is discharged to the first mixing tank body, wherein the first solvent discharged from the first solvent outlet flows into the first mixing tank and reused.

4. The desalination device of claim 2, wherein the precipitation tank further comprises a second solvent outlet through which the composite solvent is discharged, in which the second solvent outlet communicates with the second solvent inlet, and the second solvent discharged from the second solvent outlet flows into the second mixing tank and reused.

5. The desalination device of claim 2, wherein the precipitation tank body has a pH adjusted to more than 9.0 by the separation gas.

6. The desalination device of claim 1, wherein a volume ratio of the first solvent and the second solvent of the second mixing tank body is 1:1 or more and 1:2 or less.

7. The desalination device of claim 1, wherein the first separation tank further comprises a brine outlet through which the brine is discharged, in which the brine outlet communicates with the feed water inlet, and the brine discharged from the brine outlet flows into the first mixing tank and reused.

8. The desalination device using a solvent extraction method of claim 1, wherein the first solvent is any one selected from the group consisting of dipropylamine, ethylheptylamine, and ethylbutylamine, and the second solvent is any one selected from the group consisting of octanol, nonanol and decanol and from the group of vegetable oils comprising soybean oil, palm oil, canola oil and coconut oil.

9. A desalination method using a solvent extraction method, the method comprising:
a mixed water forming step of forming a mixed water by mixing feed water containing salt ions and water molecules with a first solvent selectively reacting more with the water molecules than with the salt ions;
a first separating step of allowing brine containing salt ions of the feed water and first treatment water formed from mixing the water molecules of the feed water and the first solvent of the mixed water to be separated by layer;
a second treatment water forming step of forming a second treatment water by mixing the first treatment water with a second solvent selectively reacting more with the first solvent than with the water molecules of the treatment water;
a second separating step of allowing the water molecules of the first treatment water and a composite solvent formed from mixing the first solvent of the first treatment water and the second solvent of the second treatment water to be separated by layer; and
a freshwater discharging step of allowing freshwater composed of the water molecules to be discharged.

10. The desalination method of claim 9, further comprising:
a separation gas providing step of providing separation gas selectively binding with the first solvent to the composite solvent; and
a precipitating step of allowing a first solvent precipitate formed from selectively binding the first solvent of the composite solvent with the separation gas and the second solvent of the composite solvent to be separated by layer.

11. The desalination method of claim 10, further comprising:
a first solvent reusing step of recycling and reusing the first solvent from which the separation gas of the first solvent precipitate is removed through the mixed water forming step.

12. The desalination method of claim 10, further comprising:
a second solvent reusing step of recycling and reusing the second solvent through the second treatment water forming step.

13. The desalination method of claim 9, further comprising:
a brine reusing step of recycling and reusing the brine through the mixed water forming step.

* * * * *